Sept. 21, 1965  W. E. BEUTLER ETAL  3,207,346
CONTAINER DUMPING APPARATUS
Filed May 21, 1962  4 Sheets-Sheet 1
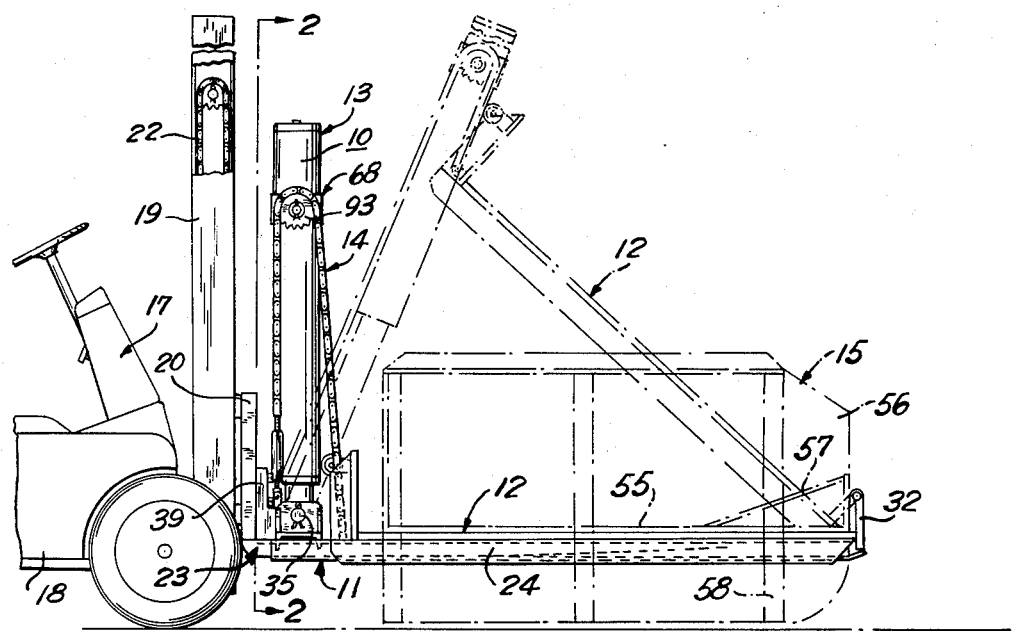
FIG. 1
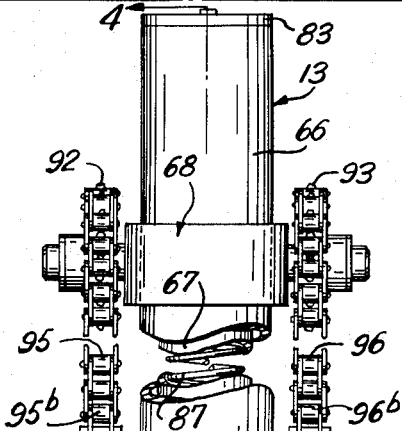
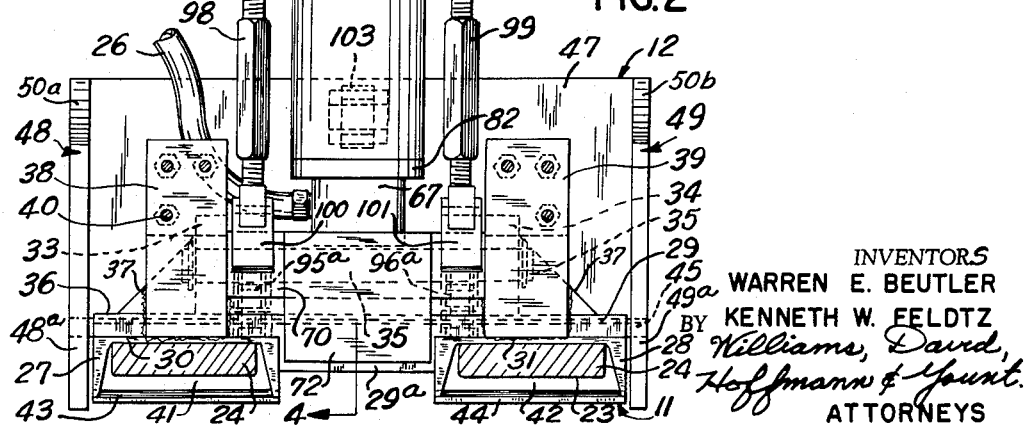
FIG. 2
INVENTORS
WARREN E. BEUTLER
KENNETH W. FELDTZ
BY Williams, David,
Hoffmann & Yount.
ATTORNEYS Sept. 21, 1965 W. E. BEUTLER ETAL 3,207,346
CONTAINER DUMPING APPARATUS
Filed May 21, 1962 4 Sheets-Sheet 2

INVENTORS
WARREN E. BEUTLER
BY KENNETH W. FELDTZ
Williams, David,
Hoffmann & Yount.
ATTORNEYS INVENTOR.
WARREN E. BEUTLER
BY KENNETH W. FELDTZ
Williams, David
Hoffmann & Yount
ATTORNEYS

United States Patent Office 3,207,346
Patented Sept. 21, 1965

3,207,346
CONTAINER DUMPING APPARATUS
Warren E. Beutler, Willoughby, and Kenneth W. Feldtz, Cleveland, Ohio, assignors to The Lamson & Sessions Company, Cleveland, Ohio, a corporation of Ohio
Filed May 21, 1962, Ser. No. 196,262
6 Claims. (Cl. 214—620)

This invention relates to apparatus for use in discharging material from a container by dumping and, as one of its objects, provides novel dumping apparatus of an economical construction and highly practical form and which operates in a safe and rapid manner.

The novel dumping apparatus can be used to particular advantage for dumping bins, such as bins of the type known as "stack bins," and can be in the form of an adapter mechanism for a conventional lift truck having fork means. The invention is accordingly described hereinafter in conjunction with such a lift truck and for dumping containers of the stack bin type, but it should be understood that the invention is not limited to such an adapter form nor to the handling of any specific container.

Another object is to provide novel dumping apparatus comprising a base having mast means rising thereabove, and a carrier adapted to support a container and swingable relative to the base for moving the container to a tipped or dumping position, the swinging of the carrier being produced by an elevator means on the mast means and by a motion transmitting means connected between the carrier and base and subject to the application of force thereto by the elevator means.

A further object is to provide such novel dumping apparatus in which the mast means is pivoted on the base for tilting toward the carrier during swinging of the latter to the container-dumping position, whereby the lifting force of the elevator means is applied in a direction for maximum mechanical advantage at all times during the swinging of the carrier to the dumping position.

Still another object is to provide novel dumping apparatus of the character above referred to wherein the motion transmitting means comprises a flexible means, preferably a strand means, having end portions thereof connected with the carrier and base and an intermediate portion to which the lifting force of the elevator means is applied, whereby a desired acceleration of the carrier is achieved in the swinging thereof to the dumping position.

Yet another object is the provide such novel dumping apparatus wherein the mast means comprises co-operating cylinder and piston members, and the elevator means for causing the swinging of the carrier comprises wheel means on the upper member of the mast means and over which the flexible strand means extends.

Additionally, this invention provides such novel dumping apparatus in which the base is adapted for engagement from the underside thereof by other elevator means, such as the fork means of a conventional lift truck, for lifting the base and carrier to a desired dumping elevation for the container.

Other objects, novel characteristics and advantages of this invention will be apparent in the following detailed description and in the accompanying drawings forming a part of this specification and in which, FIG. 1 is a side elevation showing novel dumping apparatus embodying this invention;

FIG. 2 is a larger-scale vertical section taken through the apparatus on section line 2—2 of FIG. 1;

Figure 3:
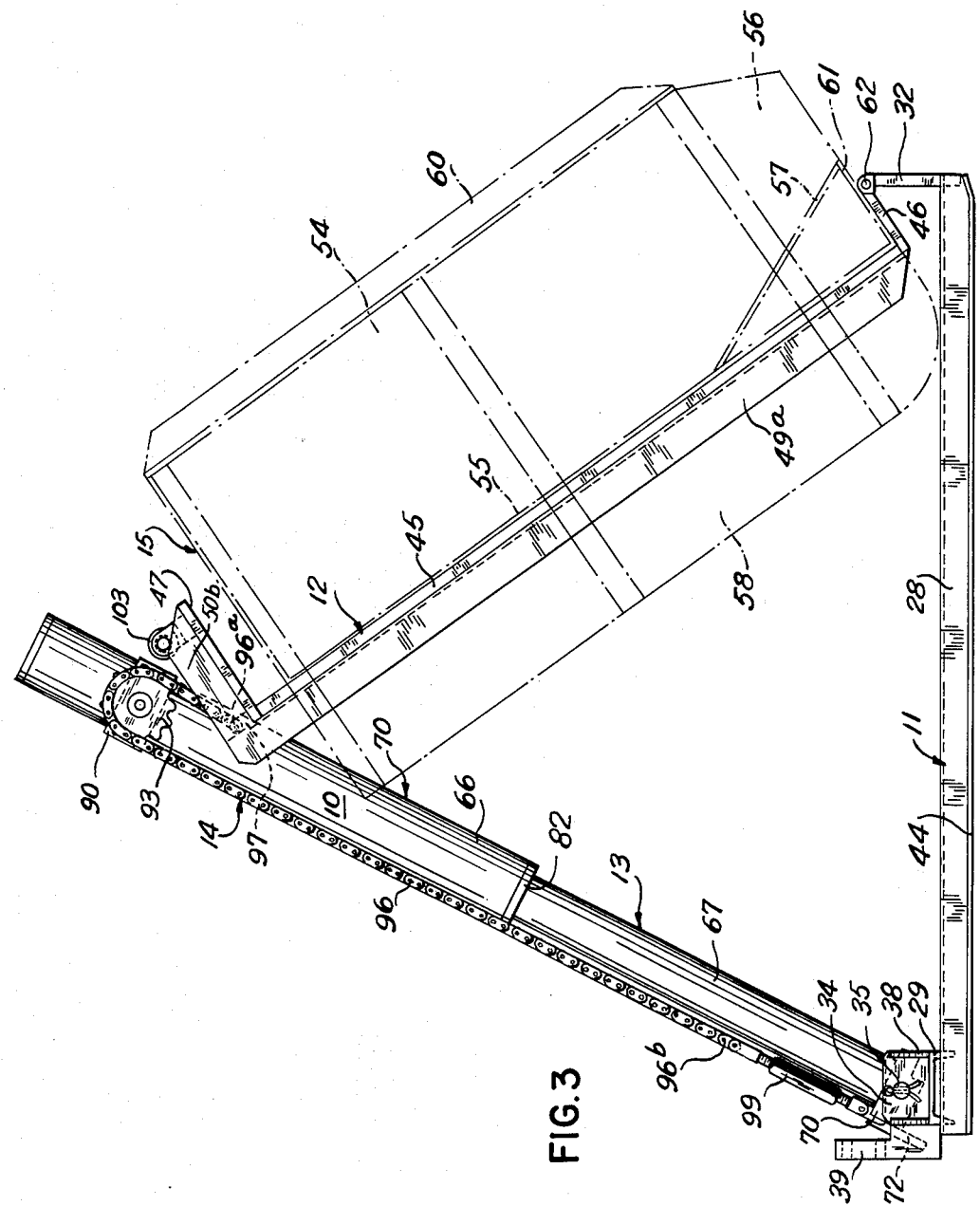
FIG. 3 is a side elevation showing the dumping apparatus apart from the lift truck and with the carrier swung to container-dumping position.

The novel container dumping apparatus 10 of this invention is shown in the accompanying drawings as comprising, in general, a base 11, a carrier 12 upwardly swingable relative to the base, a mast means 13 rising above the base, and motion transmitting means 14 connected with the carrier for imparting the upward swinging movement thereto. The carrier 12 is adapted to support a container 15 whose contents are to be discharged therefrom by a gravity-flow dumping operation. The container 15 can be of any suitable type or form and is here shown as being of the above-mentioned stack bin type which will be further described hereinafter.

The dumping apparatus 10 is usable in conjunction with a conventional lift truck in a manner described in detail hereinafter and, in FIG. 1, is shown in a mounted relation on the front end of such a lift truck 17 as an adapter mechanism. The lift truck 17 comprises a wheeled vehicle body 18 having upright post means 19 on the front end thereof and an elevator means 20, hereinafter sometimes referred to as a first elevator means, vertically movable along such post means. The lift truck 17 also comprises drive means 22 connected with the elevator means 20 for raising and lowering the same along the post means 19.

The elevator means 20 includes fork means 23 comprising a pair of laterally spaced and substantially parallel fork members 24 projecting horizontally in a forward direction from the lower portion of such elevator means. Additionally, the lift truck 17 includes a source of hydraulic pressure fluid (not shown) from which a combined supply and return conduit extends to the dumping apparatus 10 in the form of a flexible hose 26 whose purpose will be explained hereinafter. The dumping apparatus 10 can be constructed as an integral part of the lift truck 17, although it is preferably used in conjunction with the lift truck as an adapter mechanism as referred to above.

Figure 4:
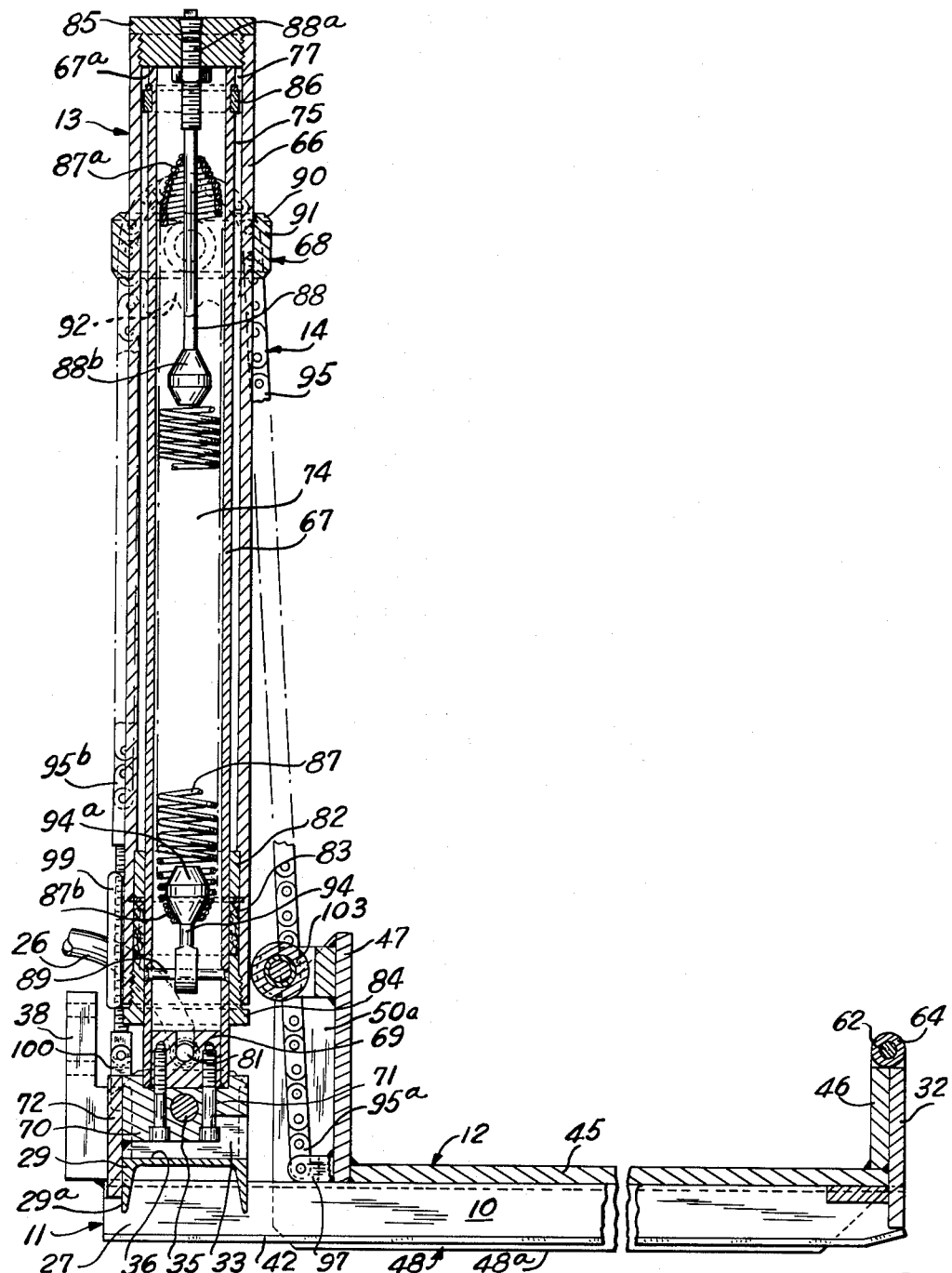
FIG. 4 is a vertical section taken through the dumping apparatus on section line 4—4 of FIG. 2.
Figure 5:
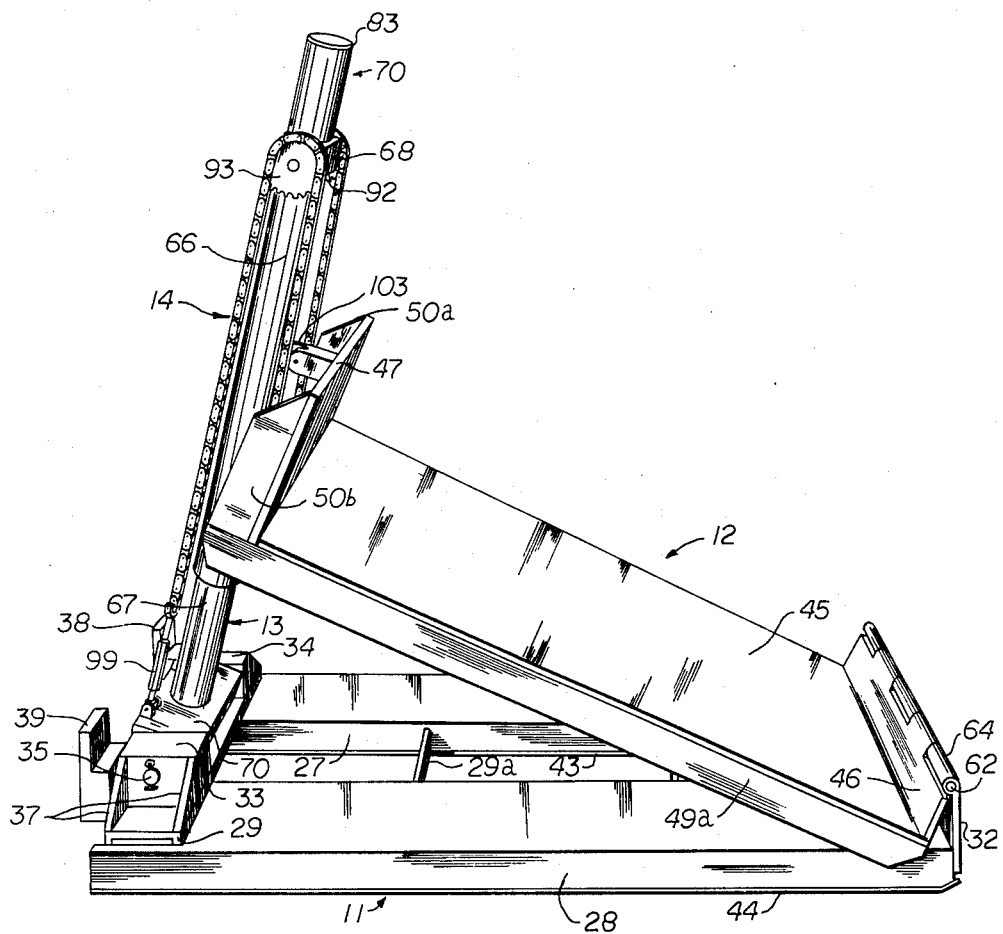
FIG. 5 is a perspective view of the apparatus.

The base 11 is here shown as being a substantially rigid horizontal structure comprising a pair of channel members 27 and 28 disposed in a laterally spaced and substantially parallel relation and connected adjacent the rear end thereof by a channel-shaped transverse frame member 29. The flanges of the transverse frame member 29 are suitably notched at the locations of the channel members 27 and 28 and the latter members have their web portions 30 secured to the notched portions of the transverse frame member by welds 31. Adjacent the front end thereof the channel members 27 and 28 are connected by a transversely extending plate member 32 located in a vertically edgewise disposed relation as shown in FIGS. 1 and 4. The plate member 32 is of a vertical width to project above the channel members 27 and 28 for a purpose to be explained hereinafter.

The base 11 also includes a pair of laterally spaced trunnion brackets 33 and 34 in which the end portions of a pivot shaft 35 are mounted. The shaft 35 provides a pivotal connection between the lower end of the mast means 13 and the base 11 in the manner explained hereinafter. The frame member 29 is disposed so that its web portion provides a suitable floor 36 to which the trunnion brackets 33 and 34 are secured as by welding. The trunnion brackets 33 and 34 include pairs of triangular brace plates 37.

Adjacent the trunnion brackets 33 and 34 the base 11 is provided with a pair of attaching brackets 38 and 39 for use in attaching the dumping apparatus 10 to the elevator means 20 of the lift truck 17. The attaching brackets 38 and 39 have their lower portions connected to the channel members 30, 31 and to portions of the trunnion brackets 33 and 34 by suitably located welds. The attaching brackets 38 and 39 have flat surfaces presented toward the vehicle body 18 and are clamped against the elevator means 20 of the lift truck 17 by suitable clamping screws 40.

The channel recesses of the channel members 27 and 28 provide a pair of parallel pockets 41 and 42 in the base 11 for receiving the arms 24 of the fork means 23. The insertion of the fork arms 24 into the pockets 41 and 42 locates these arms in a position for lifting engagement with the underside of the base 11 for supporting and lifting the dumping apparatus 10. The channel members 27 and 28 preferably have cover members 43 and 44 secured to the flanges thereof for closing the pockets 41 and 42 on the lower side thereof. These cover members confine the fork arms 24 in the pockets 41 and 42 when the arms are being inserted thereinto.

The carrier 12 can be of any suitable size and shape to accommodate the form of container to be handled by the dumping apparatus 10 and is here shown as being a cradle-like structure comprising floor means 45 and a pair of vertically edgewise disposed plate members 46 and 47 secured to the floor means along one pair of sides thereof. The carrier 12 also includes a pair of laterally spaced vertically disposed plate members 48 and 49 which are secured to the floor means 45 along another pair of sides thereof.

The plate members 48 and 49 strengthen the carrier 12 and portions of these plate members form upright brackets 50ª and 50ᵇ, respectively for reinforcing the upright plate member 47 as shown in FIGS. 2 and 4. Lower edge portions of the plate members 48 and 49 provide laterally spaced flanges 48ª and 49ª on the carrier 12 in a depending relation to the floor means 45. These depending flanges 48ª and 49ª lie alongside the outermost flanges of the channel members 27 and 28 of the base 11 when the carrier is in its initial lowered position on the base, as shown in FIGS. 2 and 4.

The container 15 can be best described at this point and is here shown as comprising a box-like structure having upright parallel side walls 54 and which is open at the top thereof. The container 15 has a floor 55 adapted to rest on the floor means 45 of the carrier 12 when the container is mounted on the latter. The container 15 includes an end opening 56 at the front end thereof which extends for a portion of the vertical height of the container and through which the contents of the container flow by gravity when the container has been moved to its tilted dumping position shown in FIG. 3.

The floor 55 includes an inclined front floor section 57 extending in a sloping relation to the discharge opening 56 for facilitating the gravity flow of material toward the latter. At the bottom thereof the container 15 is provided with a pair of laterally spaced support rails 58 as downward extensions of the side walls 54 and on which the container is adapted to rest when it stands on a floor or when it has been placed in a stacked relation to other similar containers. The space between the rails 58 and below the floor 55 accommodates the carrier 12 and is of a vertical height to permit movement of the plate members 32 and 46 therethrough when the dumping apparatus 10 is moved into position beneath the container by an approach movement of the lift truck 17 relative to the container.

The side walls 54 of the container 15 are provided along the top thereof with substantially L-shaped rails 60 having a lateral spacing suitable to receive thereon the lower rails 58 of a similar container when such similar container is placed in a stacked relation upon the container 15. Adjacent the inclined floor section 57 the container 15 is provided with an end wall member 61 extending part way across the discharge opening 56 and which is engageable by the plate member 46 of the carrier 12 as a retaining means for retaining the container on the carrier.

The carrier 12 is connected with the base 11 by a horizontally disposed hinge pivot 62 providing for vertical swinging of the carrier relative to the base from its initial lowered position shown in FIG. 4 to its lifted and tilted container-dumping position shown in FIG. 3. The hinge pivot 62 forms a pivotal connection for the carrier 12 at one side thereof by pivotally connecting the plate members 32 and 46. The plate members 32 and 46 thus form hinge leaf members and have eye portions 64 thereon through which the hinge pin of the pivot 62 extends.

The mast means 13 has the lower end thereof attached to the base 11 and is of a length to extend above the base for a suitable distance to achieve the movement of the carrier 12 to its lifted position of FIG. 3 by the action of the motion transmitting means 14. The mast means 13 is here shown as being an extensible mast means comprising co-operating cylinder and piston members 66 and 67. The cylinder member 66 is the uppermost one of the mast members and provides an elevator means 68, hereinafter sometimes referred to as a second elevator means, which is movable axially of the mast means 13. The piston member 67 forms the lowermost member of the mast means 13.

The piston member 67 is hollow for a purpose to be presently explained and is provided at its lower end with a closure plug 69 to which a mounting block 70 is attached by suitable screws 71. The lower end of the piston member 67 is pivotally connected with the base 11 by the pivot shaft 35 by reason of the latter extending through the block 70. A stop plate 72 attached to the block 70, as by suitably located welds, extends below the block for engagement with a flange portion 29ª of the frame member 29 in locating the mast means 13 in an initial vertical position as shown in FIG. 4.

The pivot shaft 35 provides for swinging of the mast means 13 toward the carrier 12 to the position of tilt shown in FIG. 3 when the mast means is in its fully extended condition. The swinging of the mast means 13 afforded by the pivot shaft 35 permits the mast means to automatically assume a tilt position relative to the carrier 12 for imparting lifting movement to the latter to best mechanical advantage at all times.

The cylinder member 66 is disposed in a surrounding and axially slidable relation on the piston member 67 so that the axial passage 74 of the piston member and the axial passage 75 of the cylinder member together form a cylinder chamber 77 to which pressure fluid is adapted to be supplied by the flexible conduit 26 for extending the mast means 13 to the condition shown in FIG. 3. The conduit 26 is connected with the passage 74 of the piston member 67 through a suitable opening 81 of the closure plug 69. The lower end of the cylinder member 66 is guided on the piston member 67 by a lower guide bushing 82 suitably mounted on the cylinder member. The lower end of cylinder member 66 is sealed around the piston member 67 by a packing 83 and an associated gland member 84. At the upper end thereof the cylinder member 66 is provided with a closure plug 85.

The upper portion of the cylinder member 66 is guided on the piston member 67 by an upper guide bushing 86 suitably mounted on the upper portion of the piston member. The upper end of the passage 74 of the piston member 67 is in communication at all times with the passage 75 of the cylinder member 66 through suitable axial grooves in the upper guide bushing 86. The extreme upper end portion of the piston member provides a stop 67ª which is engageable by the plug 85 when the cylinder member 66 is in its lowermost position as shown in FIG. 4. The upper guide bushing 86 is engageable by the lower guide bushing 82 as a stop when the mast means 13 is extended to its full extent.

The mast means 13 also includes means for producing or assisting the downward movement of the cylinder member 66 to its lowered or collapsed position of FIG. 4 and which is here shown as being a tension spring 87 located in the passage 74 of the piston member 67. The upper end of the spring 87 is attached to the plug 85 of the cylinder member 66 as by means of an upper anchor rod 88 depending from this plug member. The upper anchor rod 88 has a threaded portion 88ª mounted in the plug 85 and a head 88ᵇ on the lower end thereof as a spring seat for the tapered upper end portion 87ª of the spring 87. The lower end of the spring 87 is connected with the piston member 67 by engagement of the tapered lower spring end portion 87ᵇ with the head 94ª of a lower anchor rod 94 mounted on a transverse anchor pin 89. The anchor pin 89 is mounted on the piston member 67 at a point below the packing 83.

The stem portion of the upper anchor rod 88 is slidable in the tapered upper spring end portion 87ª and is of a length to provide a lost-motion connection between the upper end of the spring 87 and the plug member 85. This lost-motion connection facilitates the assembly of the spring 87 in the mast means 13 because the assembly can be accomplished while the spring is in an unloaded condition.

The elevator means 68 comprises, in addition to the cylinder member 66, a thrust means 90 mounted on the cylinder member adjacent the upper end thereof. The thrust means 90 includes a collar 91 surrounding the cylinder member 66 and suitably secured thereto and wheel means mounted on the collar 91 and here shown as comprising a pair of sprockets 92 and 93 located on diametrically opposite sides of the cylinder member.

The motion transmitting means 14 comprises flexible strand means, in this case a pair of chain members 95 and 96, extending over the sprockets 92 and 93 and engaged with the teeth thereof. The chain members 95 and 96 have ends 95ª and 96ª thereof, conveniently referred to as upper or pulling ends, attached to the carrier 12 at a point adjacent the upright side plate 47 thereof. The chain portions 95ª and 96ª can be suitably connected with the carrier 12 at the location just mentioned as by means of small pivot brackets 97 provided on the carrier in a laterally spaced relation.

The opposite end portions 95ᵇ and 96ᵇ of the chains 95 and 96, conveniently referred to as lower or anchored ends, are provided with turnbuckles 98 and 99 by which these chain portions are connected with a pair of anchor pivots 100 and 101. The turnbuckles 98 and 99 provide for adjustment of the length of the chains 95 and 96. The anchor pivots 100 and 101 are located on laterally opposite sides of the stop plate 72 (see FIG. 2) and are connected, as by welding, to the block 70.

From the construction and arrangement described above for the motion transmitting means 14 it will be recognized that this transmitting means also comprises a motion amplifying means for accelerating the upward movement of the carrier 12 when the mast means 13 is being actuated to its extended condition. This accelerating action results from the fact that the lower end portions 95ᵇ and 96ᵇ of the chains 95 and 96 are anchored on the block 70 of the base 11 and the upper ends 95ª and 96ª are connected with the carrier 12 while intermediate portions of the chains extend in a bight relation over the sprockets 92 and 93 and are subject to an upward thrust action by the sprockets while the mast means 13 is being axially extended.

The thrust action of the sprockets 92 and 93 against the intermediate portions of the chains 95 and 96 accordingly causes a rapid pulling and lifting action by the upper end portions 95ª and 96ª of the chains on the carrier 12 whereby the carrier is rapidly swung toward its upper tilted position and assumes a position of maximum tilt, as shown in FIG. 3, by the time that the mast means 13 has been fully extended. As the carrier 12 moves toward and assumes this position of maximum tilt, the contents of the container 15 flows therefrom by gravity through the opening 56 as a dumping discharge action for such material.

The lifting and lowering movements of the elevator means 68 are under the control of the operator of the lift truck 17 by his control of the flow of hydraulic fluid into and out of the cylinder chamber 77 through the flexible conduit 26 and the piston passage 74. The carrier 12 is prevented from scraping against the mast means 13 during the lifting and lowering swinging movements of the carrier as by means of a guide roller 103 mounted on the side plate 47 in a position for co-operative engagement of such roll with the wall of the cylinder member 66. During the release of fluid from the cylinder chamber 77 the weight of the carrier 12 and container 15, assisted by the pull of the tension spring 87, causes downward movement of the cylinder member 66 to the collapsed condition of the mast means 13. The return swinging movement of the mast means 13 terminates when the stop plate 72 engages the frame portion 29ª for locating the mast means in its initial vertical position.

From the accompanying drawings and the foregoing detailed description it will now be readily understood that this invention provides novel dumping apparatus of a simple construction and a highly practical form capable of rapid and safe functioning in the dumping discharge of material from a container. It will now also be understood that the novel dumping apparatus is usable with a conventional lift truck of the fork type for the rapid handling and dumping of different containers in succession, and that the actuation of the carrier supporting a given container is produced in an accelerated manner by motion transmitting means connected between the carrier and the base of the dumping apparatus. Additionally, it will be seen that the actuation of the carrier by an elevator means movable along a swingable mast means achieves the advantage that the mast means automatically assumes a position of tilt by which the motion transmitting means functions to best mechanical advantage for easy and rapid lifting of the container to the dumping position.

Although the dumping apparatus of this invention has been illustrated and described herein to a somewhat detailed extent, it will be understood, of course, that the invention is not to be regarded as being limited correspondingly in scope but includes all changes and modifications coming within the terms of the claims hereof.

Having described our invention, we claim:

1. In dumping apparatus for the discharge of material from a container, a base, a carrier superposed on said base, hinge means pivotally interconnecting said carrier adjacent one side portion thereof to said base for upward swinging movement of said carrier relative to said base to an inclined dumping position for said container, said hinge means including upwardly extending plate members secured to said one side portion of said carrier and said base, mast means pivotally connected to said base at a location remote from said hinge means and extending thereabove, said mast means including a linearly movable elevator operatively connected with said carrier for imparting the upward swinging movement thereto, said upwardly extending plate members forming a stop for retaining said container on said carrier when said carrier is swung to said inclined dumping position.

2. A load handing attachment for a lift truck having a vertically movable elevator means, said attachment comprising a framework having upright portions at one end adapted to be detachably connected to the lift truck elevator means and a generally horizontal load supporting portion extending forwardly from said upright positions and said lift truck and terminating in a forward end, a load carrier superposed on said horizontal load supporting portion, hinge means pivotally connecting said carrier adjacent one side portion thereof of said framework at its forward end for swinging movement about said forward end to an inclined dumping position; said hinge means including a pair of upwardly extending plate members, one of which is secured to said one side portion of said carrier and the other of which is secured to said forward end of said framework, an upwardly extending mast assembly pivotally connected to said framework adjacent said upright portions and including a linearly moveable elevator, means operatively connecting said elevator to said load carrier to swing said load carrier to said inclined dumping position, said plate members forming a stop for retaining a container on said carrier when said carrier is swung to said inclined dumping position.

3. A load handling attachment for a fork lift truck having a vertically movable elevator means including a pair of forks extending forwardly from the lift truck for supporting the attachment on the elevator means, said attachment being adapted to handle a container and comprising a framework including a pair of upright bracket members adapted to be detachably connected to said elevator means and a generally horizontal load supporting base extending forwardly from said upright bracket members at their lower end thereof and terminating in a forward end, said base including spaced apart inverted channel members for receiving said forks of said fork lift truck, a carrier comprising a forwardly extending floor means terminating in a forward end superposed on said horizontal forwardly extending base and adapted to support said container, hinge means pivotally connecting the forward end of said carrier to the forward end of said base and providing for upward swinging movement of said carrier about the pivotal connection to an inclined dumping position, said hinge means including upwardly projecting plate members on the forward ends of said carrier and said base, said plate members forming a stop for retaining said container on said carrier when said carrier is swung to said inclined dumping position, mast means extending above said base and including a linearly movable elevator means including anchor blocks mounted on said base for pivotally connecting said mast means to said base between said brackets, means operatively connecting said elevator to said load carrier at its rear end to swing said load carrier upwardly to said inclined dumping position, said mast means pivoting forwardly as said carrier swings upwardly and engagement of said carrier with said mast means limiting the forward movement of the latter as the carrier is swung upwardly, the rear end of said carrier having a means attached thereto for engaging said mast means during at least a portion of the upward movement of said carrier.

4. A load handling attachment for a fork lift truck as defined in claim 3 wherein said elevator of said mast means includes a wheel means, strand means extending between said base and carrier and guided by said wheel means, said strand means having one end portion thereof anchored on said base and the other end portion thereof connected with said carrier for an accelerated swinging movement of the latter to said dumping position in response to upward movement of said wheel means by said elevator of said mast means.

5. A dumping apparatus for the discharge of material from a container, a base, a carrier for supporting said container, said carrier being pivoted adjacent one side portion thereof on said base for upward swinging of the other side portion thereof to a tilted dumping position for said container, mast means rising above said base adjacent said other side portion of said carrier, said mast means comprising cooperating cylinder and piston members comprising therebetween a cylinder chamber, one of said members being connected with said base, the other being upwardly movable relative to said one member as an elevator means, means communicating with said cylinder chamber for supplying pressure fluid thereto and means connecting said elevator means with said other side portions for causing said upward swinging of said carrier in response to the upward movement of said elevator means, spring means connected between said cylinder and piston members for causing lowering of said elevator means, said spring means comprising a tension spring, and first and second connecting opposite devices connecting end portions of said spring with one of said cylinder and piston members, one of said connecting devices providing a lost motion connection between one end of said spring and the adjacent one of said cylinder and piston members.

6. A dumping apparatus for the discharge of material from a container, a base, a carrier for supporting said container, said carrier being pivoted adjacent one side portion thereof on said base for upward swinging of the other side portion thereof to a dumping position for the container, mast means rising above said base adjacent said other side portion of said carrier, said mast means comprising cooperative piston and cylinder members for defining therebetween a cylinder chamber, one of said members being connected to said base and the other being upwardly movable relative to said one member as an elevator means, means communicating with said cylinder chamber for supplying pressure fluid thereto, and means connecting said elevator means with said other side portion for causing said upward swinging of said carrier in response to the upward movement of said elevator means, the connection of said one member with said base comprises pivot means providing for swinging of said mast means from an initial substantially vertical position to a position of tilt inclined toward said carrier during said upward swinging movement of the latter, spring means effective between said members for causing collapse of said mast means and return swinging thereof toward said initial position, and stop means effective to limit the return swinging of said mast means, said spring means comprising a tension spring, and first and second connecting devices connecting the end portions of said spring with said cylinder and piston members, one of said connecting devices providing a lost motion connection between one end of said spring and the adjacent one of said cylinder and piston members.

References Cited by the Examiner

UNITED STATES PATENTS

| | | | |
|---|---|---|---|
| 1,607,734 | 11/26 | Fortini. | |
| 1,628,389 | 5/27 | Cochran | 214—313 |
| 1,676,127 | 7/28 | Bernier | 298—19 |
| 1,679,075 | 7/28 | Coder et al. | |
| 1,766,157 | 6/30 | Weber et al. | |
| 1,786,884 | 12/30 | Allan. | |
| 1,826,490 | 10/31 | Abbe | 214—701 |
| 2,482,692 | 9/49 | Quales et al. | 214—620 |
| 2,497,385 | 2/50 | Young et al. | 214—510 |
| 2,575,552 | 11/51 | Glenn | 214—620 |
| 2,582,759 | 1/52 | Sass | 214—620 |
| 2,606,680 | 8/52 | Herman | 214—315 |
| 2,678,742 | 5/54 | Zorn | 214—315 |
| 2,820,561 | 1/58 | Meagher | 214—620 |
| 2,865,535 | 12/58 | Johnson | 214—314 |
| 2,873,873 | 2/59 | Fowler | 214—620 |
| 2,900,098 | 8/59 | Forrest et al. | 214—650 |
| 2,975,762 | 3/61 | Blatt et al. | |

FOREIGN PATENTS

| | | |
|---|---|---|
| 1,090,853 | 10/54 | France. |
| 931,579 | 8/55 | Germany. |
| 164,961 | 6/21 | Great Britain. |

HUGO O. SCHULZ, *Primary Examiner.*

MORRIS TEMIN, *Examiner.*